(12) United States Patent
Liu et al.

(10) Patent No.: US 10,470,125 B2
(45) Date of Patent: Nov. 5, 2019

(54) MULTI-USER (MU) WAKE-UP SIGNAL TRANSMISSION BY USING FDMA SCHEME IN WLAN

(71) Applicant: MEDIATEK INC., Taiwan (CN)

(72) Inventors: Jianhan Liu, San Jose, CA (US); Thomas Edward Pare, Jr., San Jose, CA (US); Keng Leong Fong, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 3 days.

(21) Appl. No.: 15/852,548

(22) Filed: Dec. 22, 2017

(65) Prior Publication Data

US 2018/0184379 A1   Jun. 28, 2018

Related U.S. Application Data

(60) Provisional application No. 62/437,748, filed on Dec. 22, 2016, provisional application No. 62/512,748, filed on May 31, 2017.

(51) Int. Cl.

| H04W 52/02 | (2009.01) |
| H04L 27/10 | (2006.01) |
| H04W 74/00 | (2009.01) |
| H04W 84/12 | (2009.01) |

(52) U.S. Cl.
CPC ......... *H04W 52/0235* (2013.01); *H04L 27/10* (2013.01); *H04W 52/0219* (2013.01); *H04W 74/006* (2013.01); *H04W 84/12* (2013.01); *Y02D 70/00* (2018.01); *Y02D 70/10* (2018.01); *Y02D 70/1262* (2018.01); *Y02D 70/14* (2018.01); *Y02D 70/142* (2018.01); *Y02D 70/144* (2018.01); *Y02D 70/26* (2018.01)

(58) Field of Classification Search
None
See application file for complete search history.

(56) References Cited

U.S. PATENT DOCUMENTS

| 9,525,540 B1 | 12/2016 | Shellhammer et al. |
| 2014/0126442 A1 | 5/2014 | Jafarian et al. |
| 2016/0366644 A1* | 12/2016 | Ghosh ............... H04W 52/0229 |
| 2016/0374018 A1* | 12/2016 | Min ................... H04W 52/0229 |

(Continued)

*Primary Examiner* — Chi H Pham
*Assistant Examiner* — Vladislav Y Agureyev

(57) ABSTRACT

Systems and methods of transmitting a multi-user (MU) wake-up packet in WLAN including wake-up signals to activate main radios on multiple communication devices via the wake-up radios (WURs). In the multi-user wake-up packet, a frequency channel can be divided into several sub-channels for transmitting multiple wake-up signals in FDMA. Each wake-up signal is modulated in ON/OFF Key modulation. Two adjacent wake-up signals are adequately spaced apart by a certain frequency spacing to reduce adjacent channel interferences. Once a WUR on a receive device receives the packet, it generates a wake-up indication to wake up the main radio for active data communication. The MU wake-up packet may also include a sequence of multiple wake-up signals transmitted using the same sub-channel and cascaded in a time-domain. A reconfiguration window may be inserted between consecutive wake-up signals on the same sub-channel, and between a legacy preamble and the following wakeup signals.

23 Claims, 13 Drawing Sheets

(56) References Cited

U.S. PATENT DOCUMENTS

| | | | | |
|---|---|---|---|---|
| 2016/0374020 A1* | 12/2016 | Azizi | ................ | H04W 52/0229 |
| 2017/0111858 A1* | 4/2017 | Azizi | ................ | H04W 52/0212 |
| 2017/0111875 A1* | 4/2017 | Azizi | ................ | H04W 56/001 |
| 2017/0280498 A1* | 9/2017 | Min | ................ | H04L 5/0053 |
| 2018/0084499 A1* | 3/2018 | Qi | ................ | H04W 76/14 |
| 2018/0092036 A1* | 3/2018 | Azizi | ................ | H04W 52/0235 |
| 2018/0132176 A1* | 5/2018 | Abraham | ................ | H04L 43/087 |

* cited by examiner

MULTI-USER (MU) WAKE-UP SIGNAL TRANSMISSION BY USING FDMA SCHEME IN WLAN

CROSSREFERENCE TO RELATED APPLICATIONS

This patent application claims priority and benefit of: U.S. Provisional Patent Application No. 62/437,748, entitled "FDMA TRANSMISSION SCHEMES IN WLAN WITH WAKE-UP RADIOS," filed on Dec. 22, 2016; and U. S. Provisional Patent Application No. 62/512,748, entitled "FDMA OOK transmission schemes in WLAN with wake-up radios," filed on May 31, 2017. The entire content of the foregoing patent applications are herein incorporated by reference for all purposes.

TECHNICAL FIELD

Embodiments of the present disclosure relate generally to the field of network communication, and more specifically, to the field of communication protocols in wireless communication.

BACKGROUND OF THE INVENTION

Wireless local area networks (WLANs) and mobile communication devices have become increasingly ubiquitous, such as smart phones, wearable devices, various sensors, Internet of Things (IoTs), etc. With its overall size constrained by portability requirements, such a communication device typically is powered by a built-in battery of limited charging capacity. Most workloads of a communication device can be communication-driven and therefore the wireless radio is a major power consumption source as it needs to remain operational to ensure prompt responses to data communication requests.

To reduce power consumption by the wireless radios, some communication devices include a main radio and a low-power wake-up radio (WUR). When it is not involved in data communication tasks, the main radio can be placed into a power conservation state, e.g., a sleeping mode or even turned off. On the other hand, the low-power wake-up radio (WUR) remains active and operates to activate the main radio whenever the WUR receives a data communication request that is directed to the main radio, e.g., in a form of a wake-up signal transmitted from a WI-FI access point (AP).

Compared with a main radio with high rate data communication capabilities and complex processing functions, a WUR is a low-cost and low power consumption radio and yet suffices to receive and process a wake-up signal and accordingly activate the main radio. For example, the nominal power consumption of a WUR can be 0.5-1 mW or even less.

The Institute for Electronic and Electrical Engineers (IEEE) 802.11 family specifies technical standards for WLANs. The latest generations of IEEE 802.11 standards adopt multi-user (MU) communication schemes, such as Multi-User Multiple-Input Multiple-Output (MU-MIMO) and Orthogonal Frequency-Division Multiple Access (OFDMA). However, there is lacking an MU transmission mechanism that enables simultaneous wake-up signal communication between a transmitter and multiple WUR receivers.

SUMMARY OF THE INVENTION

Accordingly, systems disclosed herein provide protocols for efficient wake-up signal communication by enabling a transmitter to transmit a single wake-up packet to activate main radios on multiple communication devices in a wireless local area network (WLAN). The protocols utilize a simple modulation scheme and low-interference bandwidth allocation schemes for wake-up signals, which facilitate low-cost and low-power designs of the WURs.

Embodiments of the present disclosure use Frequency-Division Multiple Access (FDMA) to transmit multiple wake-up signals in a single packet to wake-up radios (WURs) of multiple receive devices, where the wake-up signals are modulated in ON/OFF Key (OOK) modulation. A WUR according to embodiments of the present disclosure operates in a narrow band. In a multi-user (MU) wake-up packet, a frequency channel can be divided into several sub-channels for transmitting multiple wake-up signals in FDMA. For example, a frequency channel of a 20 MHz bandwidth may carry two or three OOK wake-up signals directed to two receiver devices, and each wake-up signal occupies a particular 4 MHz sub-channel which can be determined through a prior negotiation process with the transmit device. The simple OOK modulation and transmission in FDMA advantageously increase spectrum usage efficiency in wake-up signal transmission.

Two adjacent wake-up signals are adequately spaced apart by certain frequency spacing to reduce adjacent channel interferences (ACI), e.g., the frequency spacing being 4 MHz or 2 MHz. The reduced ACI advantageously leads to reduced performance requirements for the analog baseband filter in the WUR, resulting in simplified circuitry design and reduced development and manufacturing cost.

Once a WUR, on a receive device, receives the packet, it converts the OOK wake-up signal to a wake-up indication to wake up the main radio for active data communication. This removes the needs for a main radio to wake up frequently to check if there is any data communication task, and the power consumption associated therewith is reduced. Also, as a single packet transmission can wake up multiple communication devices, the average latency of transmitting and processing wake-up signals in the WLAN can be substantially and advantageously reduced.

In some embodiments, an MU wake-up packet may include a sequence of multiple wake-up signals transmitted using the same sub-channel and cascaded in a time-domain. In addition to OOK wake-up signals, a data frame may also be enclosed in an MU wake-up packet and directed to a receive device with its main radio already in an operational state. A reconfiguration window may be inserted between consecutive wake-up signals on the same sub-channel.

In some embodiments, an MU wake-up packet may include a legacy preamble used to prevent legacy devices from transmitting signals during the wake-up packet transmission.

As the transceiver in a transmit device typically needs resettle time from generating waveforms for one wake-up signal to another, and from generating waveforms for a preamble to generating waveforms of a wakeup signal, a reconfiguration window may be inserted between different types of waveforms in a time-domain.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Figure 1:
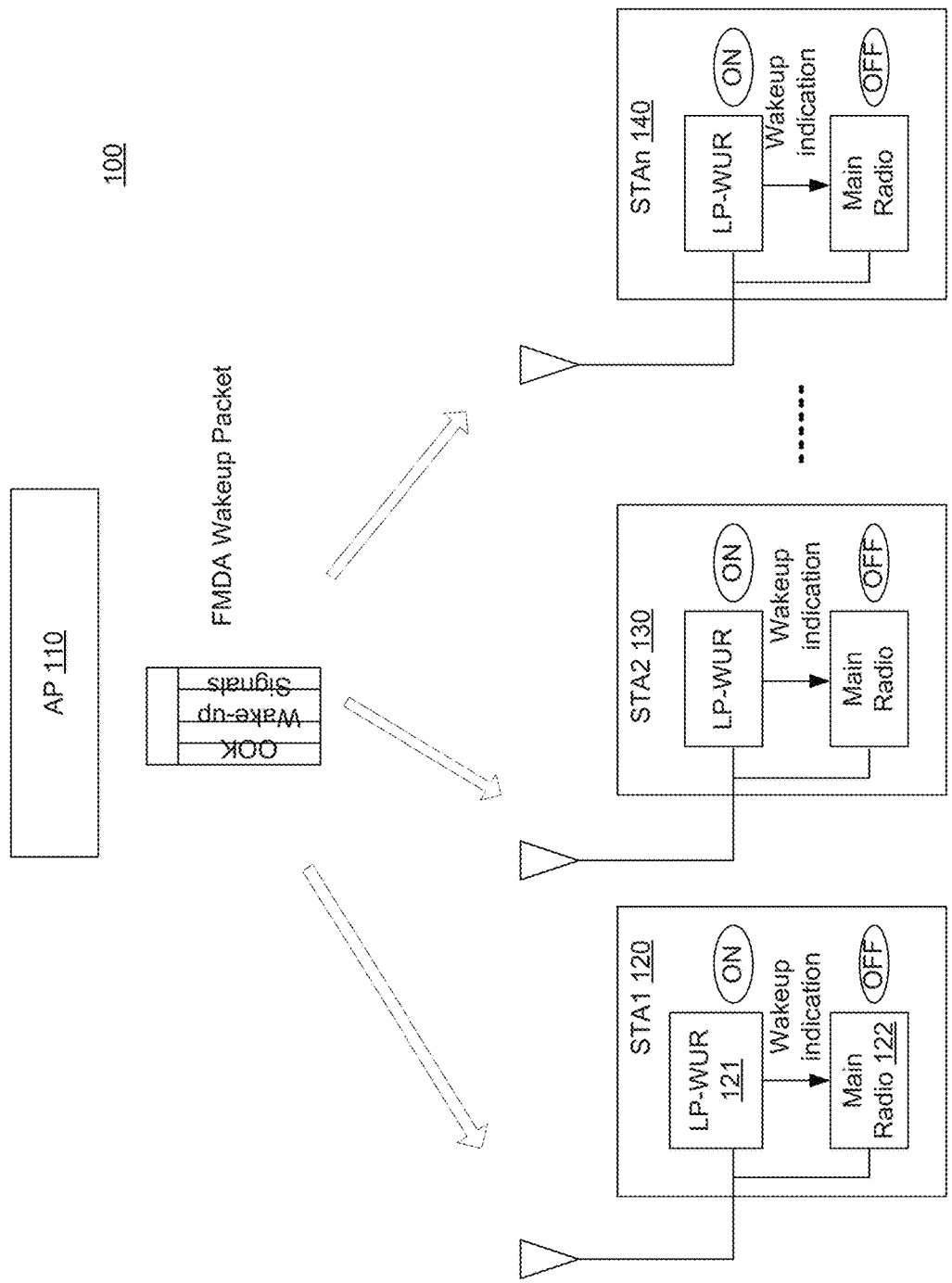
FIG. 1 illustrates an exemplary WLAN in which an access point (AP) can transmit an MU wake-up packet to wake up the main radios of multiple non-AP stations (STAs) in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the Figures. Similarly, although the views in the drawings for the ease of description generally show similar orientations, this depiction in the Figures is arbitrary for the most part. Generally, the invention can be operated in any orientation.

Multi-User (MU) Wake-Up Signal Transmission by Using FDMA Scheme in WLAN

Overall, embodiments of the present disclosure provide communication protocols for transmitting and receiving a multi-user (MU) wake-up packet containing wake-up signals directed to multiple receive devices. In a wireless local area network (WLAN), when a transmit device attempts to wake up several receive devices from a sleeping mode, the transmit device generates an MU wake-up packet with wake signals in On/Off Key (OOK modulation). Each OOK modulated wake-up signal is mapped to a specific frequency sub-channel and transmitted in FDMA. Upon receiving the MU wake-up packet, a wake-up radio (WUR) in a receive device can identify the wake-up signal directed to the instant receive device and accordingly wake up the main radio in the device.

The communication devices according to embodiments of the present disclosure may have main radios configured to use one or more wireless communication technologies, such as Bluetooth®, WI-FI and/or cellular technologies, e.g., LTE, 4G, 5G, etc.

FIG. 1 illustrates an exemplary WLAN 100 in which an access point (AP) can transmit an MU wake-up packet 110 to wake up the main radios of multiple non-AP stations (STAs) in accordance with an embodiment of the present disclosure. The AP 110 and the STAs 120, 130 and 140 may belong to one Basic Service Set (BSS). Each of the STAs 120, 130 and 140 has a main radio and a low power WUR (LP-WUR). For example for power preservation, the main radio 122 in STA 120 can be powered off or placed in a sleeping state or otherwise an inactive state. In such a state, the main radio 122 is unable to receive or transmit packets. While the main radio is in the inactive state, the WUR 121 remains active and can receive a wake-up signal transmitted from another device, e.g., the AP 110. The WUR 121 operates to switch the main radio back to an active state responsive to a received wake-up signal.

According to embodiments of the present disclosure, the AP 110 can identify multiple STAs that need to be activated, e.g., for receiving data or transmitting data. The AP 110 then generates an MU wake-up packet 111 enclosing the wake-up signals for multiple intended STAs. In this manner, more than one STA can receive wake-up signals at the same time and respectively process their own wake-up signals independently and simultaneously. From the AP's perspective, this can advantageously and significantly decrease the number of channel accesses to the AP and reduce the latency to wake up multiple STAs.

To achieve a range coverage of the entire WLAN, a WUR preferably operates on a narrow band. For example, a frequency bandwidth for transmitting a wake signal can be 1 MHz, 2 MHz, 4 MHz or 5 MHz. As described below, a frequency channel that is normally allocated for data transmission can be divided into several sub-channels, and selected sub-channels can be used to carry wake-up signals. However, it will be appreciated that any reasonable bandwidth can be used to transmit a wake-up signal without departing from the scope of the present disclosure.

It will be further appreciated that the particular frequency band allocated to a STA can be determined through a negotiation and/or training process between the STA and the AP. A negotiation process may be performed by the main radio on the STA while it is in an active state or by the WUR itself. Wake-up signals for a specific STA are fixed at the negotiated frequency band which can be changed through a new negotiation and/or training process according to a specific negotiation protocol.

According to the present disclosure, the AP 110 is configured to modulate a wake-up signal using On-off keying (OOK) modulation in the allocated sub-channel. In general OOK modulation is a simplest form of amplitude-shift keying (ASK) modulation that represents digital data at the presence or absence of a carrier wave. The AP 110 can transmit multiple OOK-modulated wake-up signals in an MU wake-up packet by FDMA. A WUR receiving the MU wake-up packet can determine whether the packet contains a wake-up signal intended for the instant STA based on whether the carrier wave in the anticipated frequency sub-channel is present. Because of the simple OOK modulation used for wake-up signals, WURs according to embodiments of the present disclosure can have relatively uncomplicated and power efficient configurations as the circuitry used to process OOK signals can be made low-power and low-cost. Further, using simple OOK modulation and FDMA transmission to multiple users advantageously increase spectrum usage efficiency and time efficiency.

To further reduce power consumption of an STA, the WUR itself may have a sleep protocol. For example, a WUR needs to periodically stay awake for a certain window of time ("WUR awake window") followed by a sleep window ("WUR sleep window"). The awake window duration can be determined based on the transmission duration of a wake-up signal, the number of STAs having WURs in the BSS, and the power consumption requirements of the WUR. For exmaple, the WUR awake windows can be set to 2 ms to 20 ms. To ensure low latency in responding to a wake-up signal, WUR sleep windows should be relatively short, e.g., 90 ms. Preferably, WUR sleep windows are set to be different from beacon intervals to avoid collision between beacons and wake-up signals. The WUR sleep protocol can be determined through a negation or coordination process with the AP.

In some embodiments, an MU wake-up packet includes a legacy preamble used to spoof legacy devices that are not equipped to process MU wake-up packets, for example because they lack a WUR. The legacy preamble carries information about the length of the MU wake-up packet and notifies a legacy device receiving the packet to refrain from transmitting signals during the packet transmission. The legacy device may be a High Throughput (HT) device, a Very High Throughput (VHT) device, and a High Efficient (HE) device as defined in various IEEE 802.11 standards, or any other type of legacy device.

In addition, an MU wake-up packet may include a wake-up preamble containing a signature sequence of wake-up signals, a receive STA ID, a BSS ID, an AP ID, a data portion an optional length portion, a frame check sequence (FCS), and/or any other suitable fields and information. In some embodiments, instead of specific STA IDs, an MU wake-up packet includes a group ID of a group of STAs to identify the receive STAs, e.g., all the STAs in a home network. Well-known fields and information that can be included in MU wake-up signal packets are omitted from the figures and the description for purposes of brevity.

Figure 2:
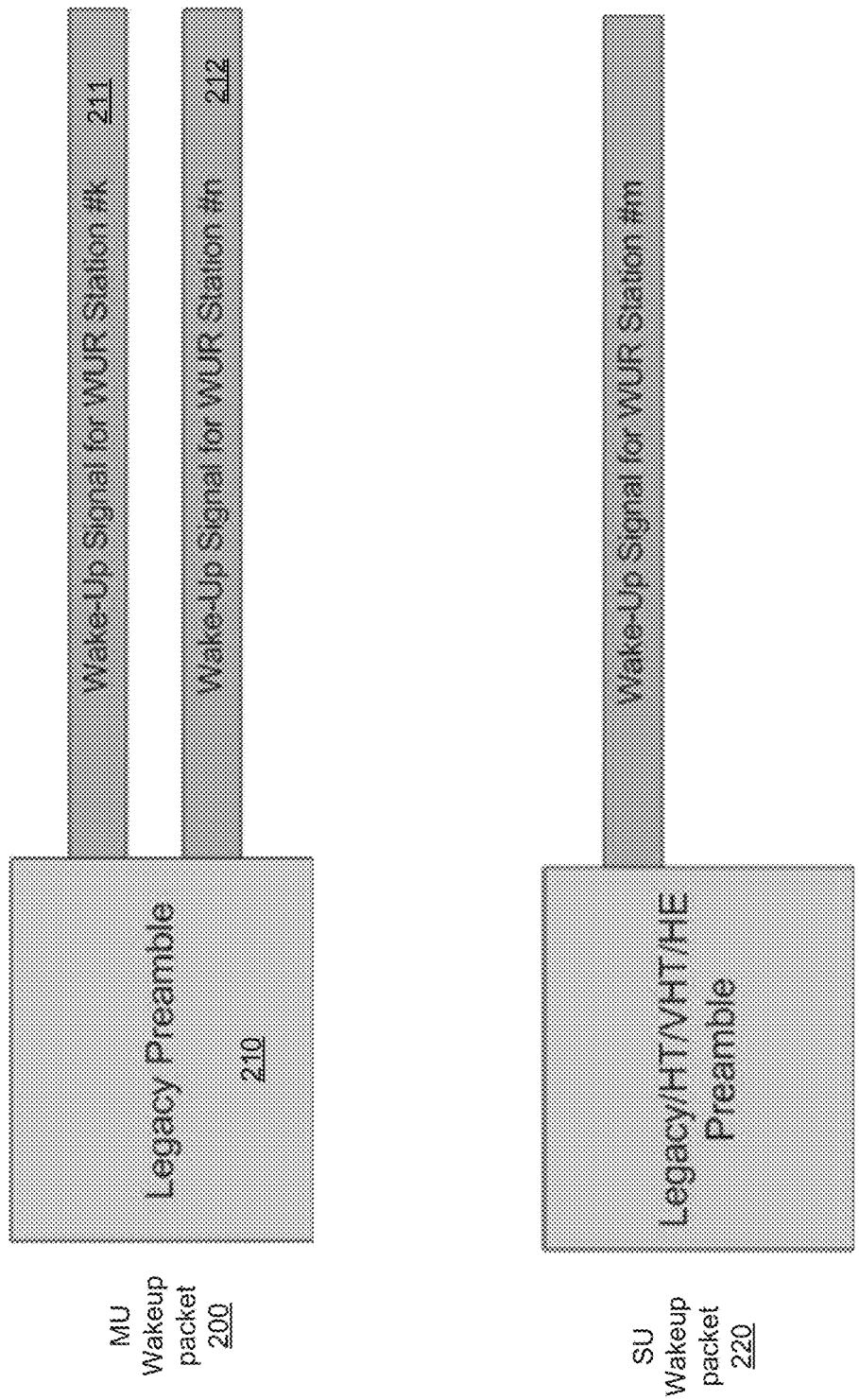
FIG. 2 illustrates an exemplary format of MU wake-up packets for carrying multiple wake-up signals and a single wake-up signal in accordance with an embodiment of the present disclosure.

FIG. 2 illustrates an exemplary format of MU wake-up packets for carrying multiple wake-up signals and a single wake-up signal in accordance with an embodiment of the present disclosure. The MU wake-up packet 200 includes a legacy preamble 210 transmitted in a frequency channel of 20 MHz bandwidth. Two wake-up signals 211 and 212 directed to WUR stations #k and #m follow the legacy preamble. The wake-up signals 211 and 212 are OOK modulated and transmitted in FDMA by occupying two sub-channels of the 20 MHz bandwidth respectively, e.g., 4 MHz for each sub-channel. In the case that only one STA needs to wake up, the AP can generate a single user (SU) wake-up packet by using the same format. Thus, only one OOK wake-up signal is transmitted to the intended single STA #m, as shown in 220.

Figure 3:
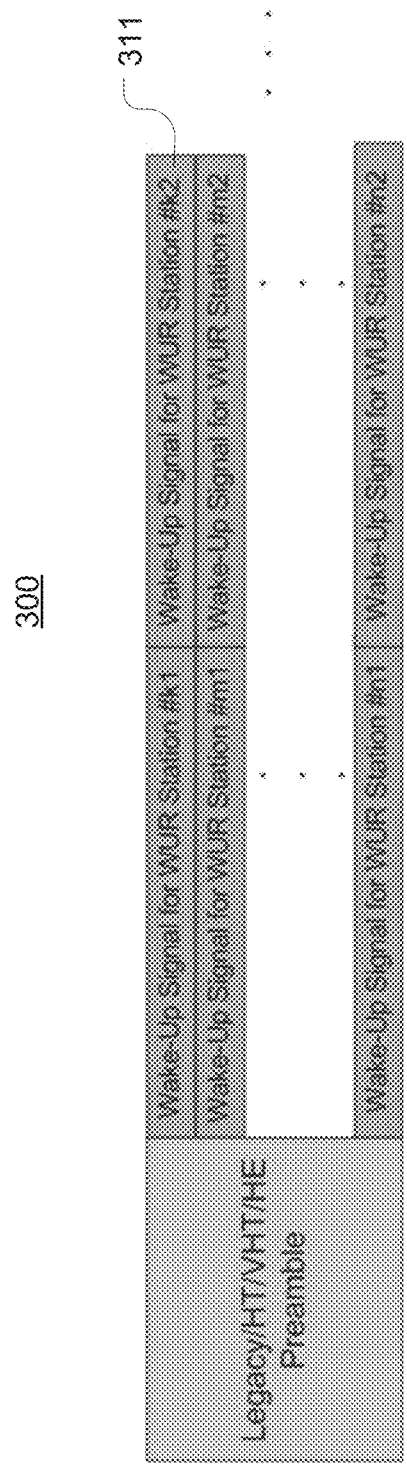
FIG. 3 illustrates an exemplary format of an MU wake-up packet enclosing time-domain cascaded OOK wake-up signals that are transmitted in FDMA in accordance with an embodiment of the present disclosure.

In some embodiments, MU wake-up signal transmission can use FDMA in combination with a time-domain cascaded scheme. An AP can wake up multiple STAs with WURs operating on the same sub-channel by using cascaded transmission of wake-up signal sequences. FIG. 3 illustrates an exemplary format of an MU wake-up packet 300 enclosing time-domain cascaded OOK wake-up signals that are transmitted in FDMA in accordance with an embodiment of the present disclosure. As shown, STA #k1 and STA #k2 are allocated with the same sub-channel for wake-up signals. Likewise, STA #m1 and STA #m2 share the same sub-channel, and STA #n1 and STA #n2 share the same sub-channel. Each sub-channel carries multiple wake-up signals which are arranged in a time-domain cascaded sequence. For example, the first sub-channel 311 carries the wake-up signal for STA #k1 followed by the wake-up signal #k2. In this configuration, an MU wake-up packet can be used to wake up a number of STAs that is greater than the number of available sub-channels, further increasing time efficiency of transmitting wake-up signals in a BSS. Correspondingly, the duration field in the SIG field of the legacy preamble should be large enough to protect the transmission of all cascaded wake-up sequences.

In some embodiment, an MU wake-up packet can combine multiple wake-up signals for waking up some inactive STAs and a data frame directed to an active STA. The active STA may be equipped with a WUR and a main radio that has already entered an active state responsive to a wake-up indication generated by the WUR. Alternatively, the active STA may only have a main radio that remains active constantly during operation of the STA.

Figure 4:
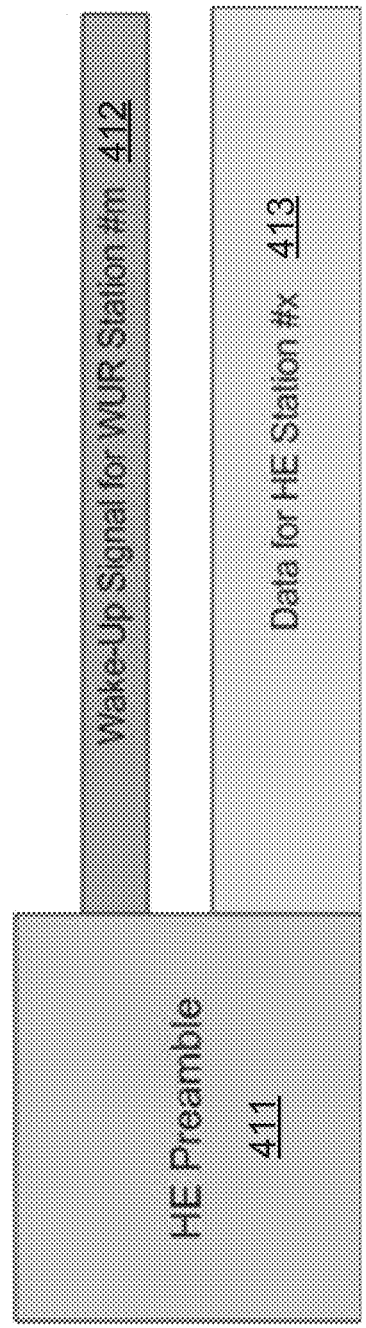
FIG. 4 illustrates the format of an exemplary MU wake-up packet carrying an OOK-modulated wake-up signal and a data frame in accordance with an embodiment of the present disclosure.

FIG. 4 illustrates the format of an exemplary MU wake-up packet 400 carrying an OOK-modulated wake-up signal 412 and a data frame 413 in accordance with an embodiment of the present disclosure. For instance, a high efficiency (HE) STA #k in compliance with IEEE 802.11ax standards is in an active state and is the intended receive device for the data frame. The data frame is modulated in OFDMA modulation. The packet has a HE preamble 411 containing the required signaling for the HE STA #k. However, an MU wake-up packet according to embodiments of the present disclosure may contain one or more data frames for any other suitable type of STAs.

The wake-up signal 412 uses OOK modulation or frequency shifting key (FSK) modulation and is intended for an inactive STA with a WUR. It will be appreciated that the present disclosure is not limited by the number of wake-up signals or the number of data frames that can be included in an MU wake-up packet. When multiple OOK wake-up signals are included the packet, they are transmitted in FDMA. Due to the use of different types of modulation, the wake-up signal and the data frame may potentially interfere with each other. The receive STAs may use filtering and/or rate adaptation to reduce or eliminate the interference, which can be implemented in any manner that is well known in the art.

Figure 5A:
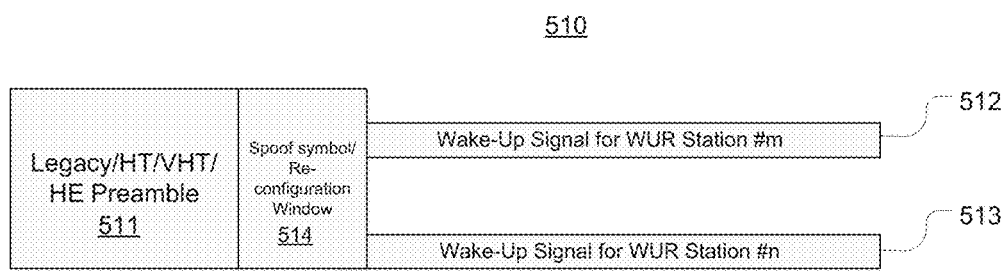
FIG. 5A shows the format of an MU wake-up packet including a reconfiguration window inserted between a legacy preamble and OOK wake-up signals directed to two receive STAs in accordance with an embodiment of the present disclosure.

In some embodiments, a reconfiguration window can be inserted between a legacy preamble and the following wake-up signals, e.g., a legacy/HT-VHT/HE preamble. The reconfiguration window advantageously provides a resettling period for the transmitter to adjust its configurations from generating one type of waveforms to another, such as power, bandwidth and RF/analog circuitry settings. For example, the duration of the window may correspond to a transient period for the transmitter to switch from waveform generation for the legacy preamble to waveform generation for the wake-up radio signal. Signals transmitted in this reconfiguration window are treated as being unreliable and will not be processed as valid signals by the receive STAs. FIG. 5A shows the format of an MU wake-up packet 510 including a reconfiguration window 514 inserted between a legacy preamble 511 and OOK wake-up signals 512 and 513 directed to two receive STAs in accordance with an embodiment of the present disclosure. The reconfiguration window 514 may also serve as an additional spoofing symbol for a particular generation of legacy devices, such as devices in compliance with IEEE 802.11n standards. The reconfiguration symbols may be generated using Binary phase shift keying (BPSK) modulation.

Figure 5B:
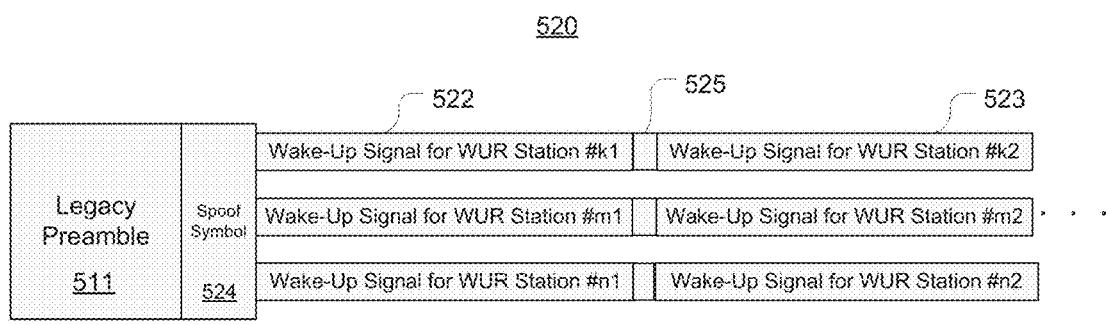
FIG. 5B shows the exemplary format of an MU wake-up packet including exemplary spoof symbols inserted between OOK wake-up signals and a spoof window inserted between a legacy preamble and OOK wake-up signals sequences in accordance with an embodiments of the present disclosure.

FIG. 5B shows the exemplary format of an MU wake-up packet 520 including exemplary spoof symbols inserted between OOK wake-up signals and a spoof window 524 inserted between a legacy preamble 521 and OOK wake-up signals sequences in accordance with an embodiments of the present disclosure. As shown, the packet 520 carries time-domain cascaded OOK wake-up signals that are transmitted in FDMA. One sub-channel is used to transmit a sequence of wake-up signals directed to multiple receive STAs. The spoofing symbol 524 inserted between the legacy preamble 521 and the wake-up signals also serves as a resettle period for the transmitter as noted above with reference to FIG. 5A. In addition, a reconfiguration window (e.g., 525) is also inserted between transmission of two adjacent wake-up signals on the same sub-channel. For example, the window 525 may be much smaller than the spoofing symbol 524.

Figure 6A:
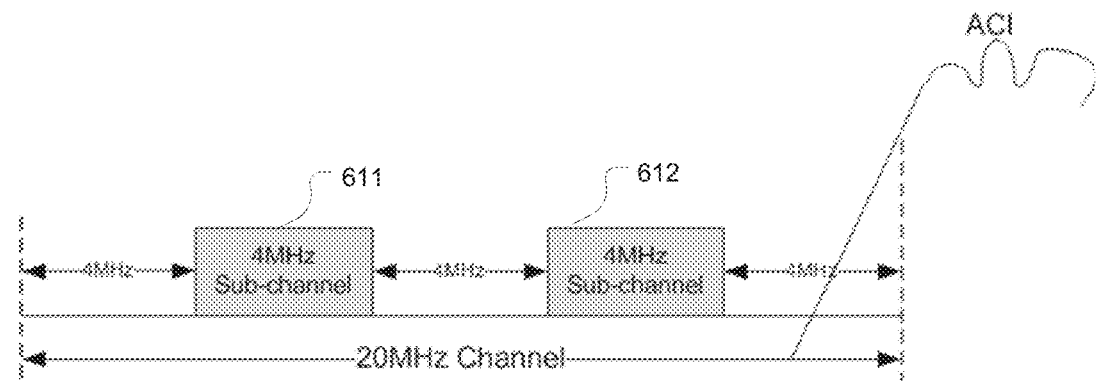
FIGS. 6A-6B illustrate exemplary multiplexing schemes of frequency sub-channels for transmitting multiple OOK wake-up signals in FDMA in an MU wake-up signal packet according to embodiments of the present disclosure.
Figure 6B:
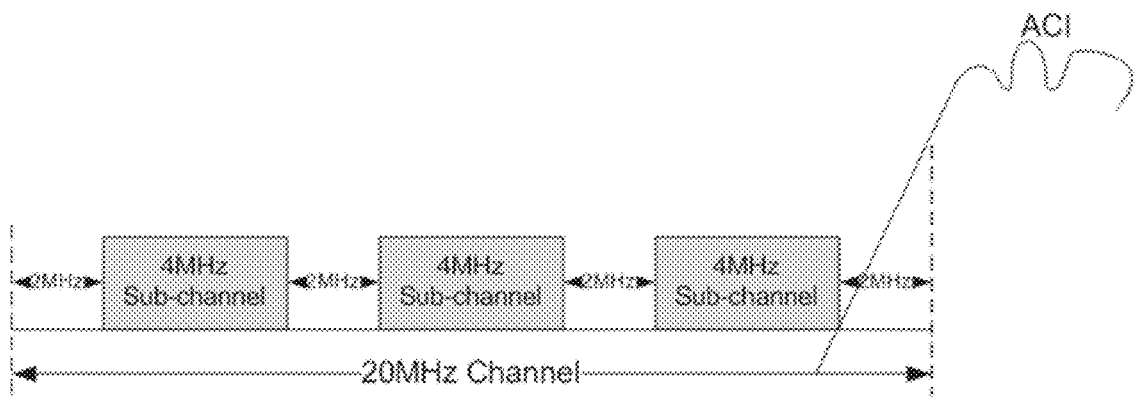

As a WUR according to embodiments of the present disclosure can operate in a narrow band, a frequency channel can be divided into several sub-channels for transmitting multiple wake-up signals in FDMA. FIGS. 6A-6B illustrate exemplary multiplexing schemes of frequency sub-channels for transmitting multiple OOK wake-up signals in FDMA in an MU wake-up signal packet according to embodiments of the present disclosure. FIG. 6A shows that a 20 MHz frequency channel is evenly divided into 4 MHz sub-channels and two of the middle sub-channels 611 and 612 are used for transmitting wake-up signals. The two sub-channels 611 and 612 are separated by a frequency spacing of 4 MHz to reduce interference between each other, and the edge sub-channels are unused. FIG. 6B shows that a 20 MHz frequency channel is divided unevenly into three 4 MHz and four 2 MHz sub-channels, where each of the 4 MHz sub-channels is used for transmitting a wake-up signal in FDMA, whereas the 2 MHz sub-channels serve as frequency spacings between the wake-up signals. The edge 2 MHz-sub-channels are unused.

By separating two adjacent wake-up signals by an adequate frequency spacing, adjacent channel interferences (ACI) can be advantageously reduced, the frequency spacing being 4 MHz or 2 MHz. The reduced ACI advantageously leads to reduced performance requirements for the analog baseband filter in the WUR, and therefore simplifies the circuitry design reduces the development and manufacturing cost of the WUR.

Figure 7A:
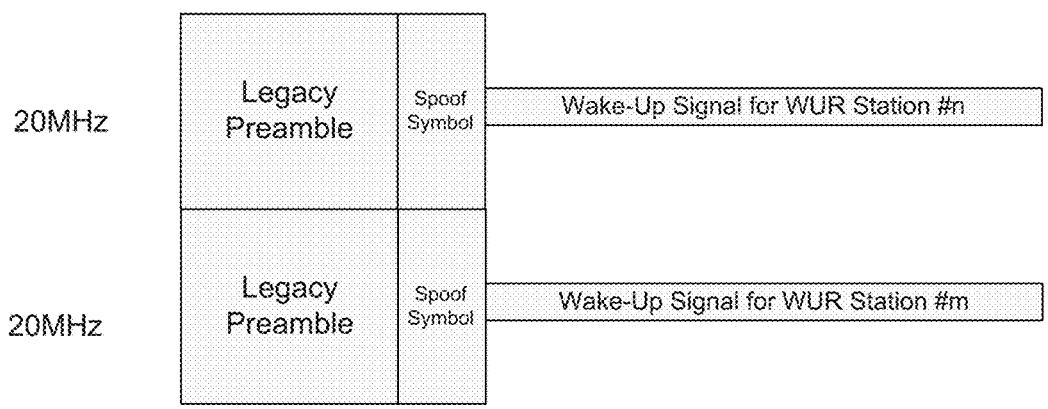
FIGS. 7A and 7B illustrate exemplary frequency band usage in transmitting OOK wake-up signals in an MU wake-up packet according to embodiments of the present disclosure.
Figure 7B:
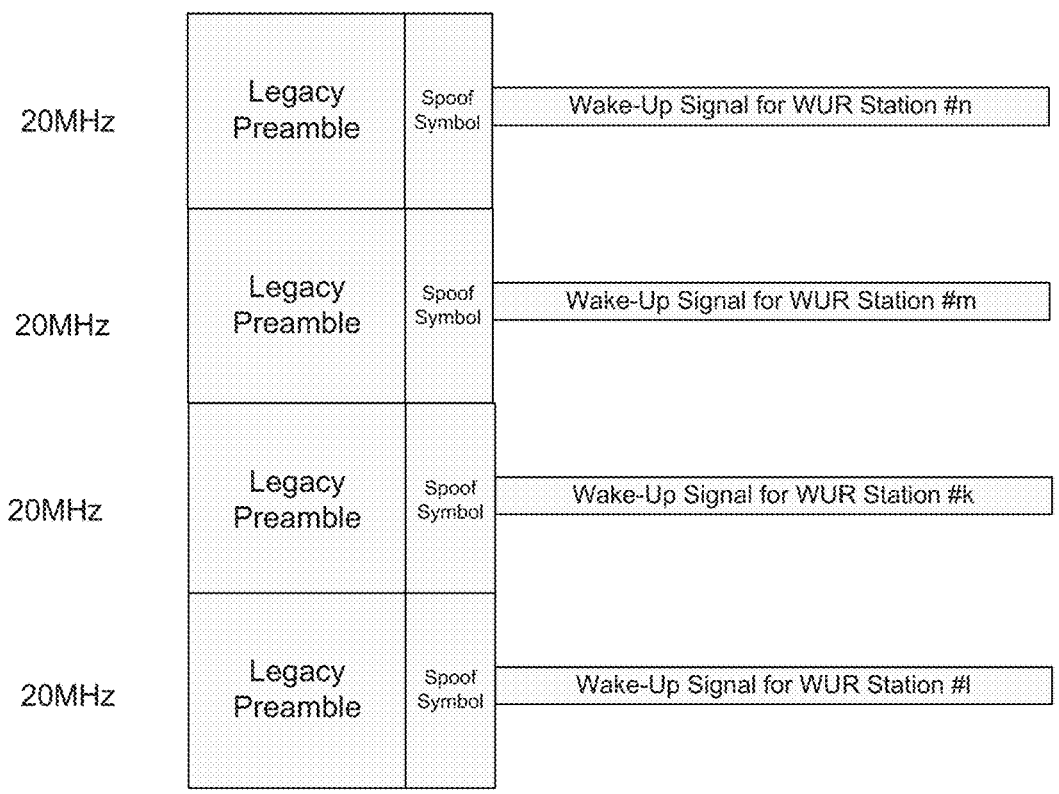

FIGS. 7A and 7B illustrate exemplary frequency band usage in transmitting OOK wake-up signals in an MU wake-up packet according to embodiments of the present disclosure. FIG. 7A shows that a 40 MHz band is used to transmit two wake-up signals in FDMA for STA #n and #m, each wake-up signals preceded with a legacy preamble and a spoof symbol. The 40 MHz band is divided into two 20 MHz-frequency channels and the two preambles are each transmitted in one channel. For each frequency channel, a sub-channel is used to transmit an OOK wake-up signal. Similarly, FIG. 7B shows that a 80 MHz band is used to transmit four wake-up signals STA #n, #m, #k and #l in FDMA, each wake-up signals preceded with a legacy preamble and a spoof symbol. In each 20 MHz frequency channel, a sub-channel is used to transmit an OOK wake-up signal.

Figure 8A:
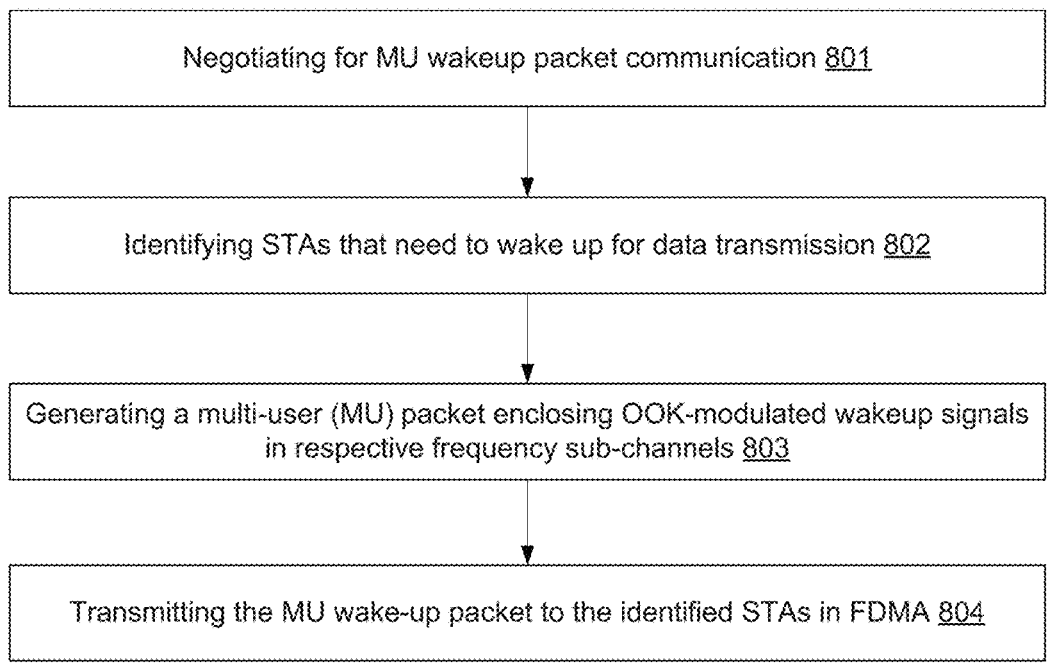
FIG. 8A is a flow chart depicting an exemplary process of transmitting an MU wake-up packet in accordance with an embodiment of the present disclosure.

FIG. 8A is a flow chart depicting an exemplary process 800 of transmitting an MU wake-up packet in accordance with an embodiment of the present disclosure. Process 800 may be performed by an AP STA, a non-AP STA, or any other suitable wireless communication device operable to transmitting a wake-up signal over a WLAN to wake up an inactive wireless communication device.

At 801, a negotiation process is performed to coordinate between a transmit device and receive device about MU wake-up packet communication, e.g., by a main radio of an AP. The negotiation between an AP and a receive STA may determine parameters of various aspects to be used in MU wake-up packet transmission, such as center frequency, frequency bandwidth, OOK modulation parameters, sleep protocol of the WUR, and etc. The negation process may involve the WUR or a main radio of the receive STA. It will be appreciated renegotiation may occur under various suitable circumstances, e.g., periodically, or responsive to user instruction or certain events such as introduction of a new STA.

At 802, the AP identifies one or more STAs whose main radios need to wake up for data communication, e.g., for receiving downlink data packets, transmitting uplink data packets, or communicating packets with other peer STAs. At 803, an MU wake-up packet is generated enclosing wake-up signals directed to multiple identified STAs. Each wake-up signal is modulated using OOK/FSK modulation and mapped to the negotiated frequency sub-channel. As described above, more than one wake-up signal may be allocated to the same frequency sub-channel and cascaded in the time-domain. If there is only one STA that needs wake up, an SU packet can be generated using the same packet format. Further, the MU wake-up packet may also include one or more data frames directed to active STAs. It will be appreciated that generating an MU wake-up packet may involve a wide range of signal processing, such as padding, scrambling, encoding, parsing, frequency mapping, and so on.

At 804, the MU wake-up packet is transmitted through a transmitter and an antenna array of the AP device. The foregoing 802-804 may repeat periodically, according to a scheduling algorithm, or may be triggered by certain events.

The present disclosure is not limited by the mechanisms of generating waveforms of FDMA OOK wake-up signals in a transmitter. In some embodiments, such waveforms can be generated in a baseband module (e.g., using the main radio of the AP) and then digitally modulated to the corresponding sub-channel of a narrow bandwidth. Each sub-channel may contain at least one OOK wake-up signal and each wake-up signal is used to wake a certain STA with a WUR.

Figure 8B:
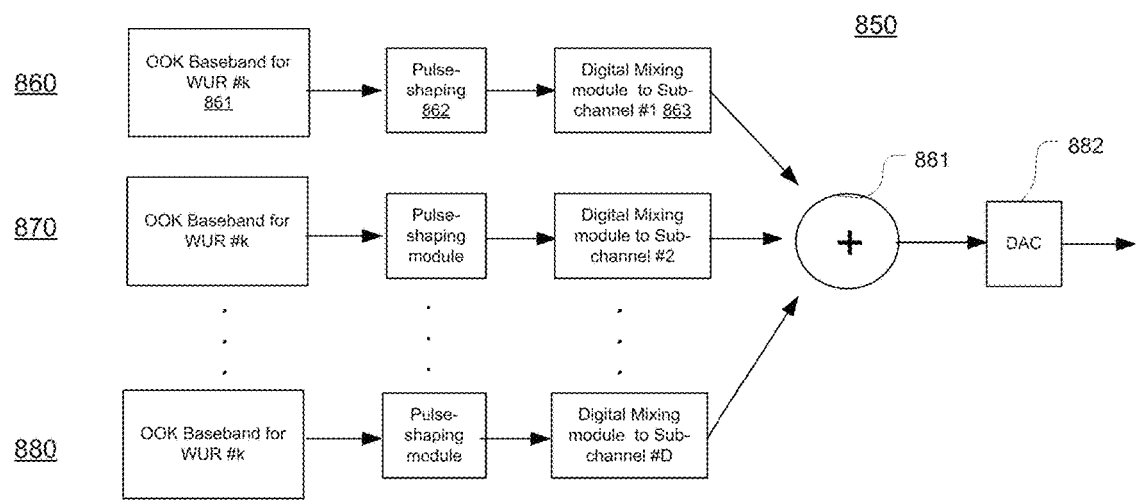
FIG. 8B illustrates exemplary transmitter modules configured to generate waveforms of multiple wake-up signals included in an MU wake-up packet according to an embodiment of the present disclosure.

FIG. 8B illustrates exemplary transmitter modules configured to generate waveforms of multiple wake-up signals included in an MU wake-up packet according to an embodiment of the present disclosure. The transmitter (not explicitly shown) has parallel processing paths 860, 870 and 880 that can operate concurrently to generate multiple wake-up signals. Each path includes an OOK baseband circuit, a pulse shaping circuit and a digital mixer for a respective sub-channel. For example, for a wake-up signal directed to STA #k (or WUR #k), the OOK baseband circuit 861 modulates the carrier signal in OOK modulation and generates a baseband OOK signal. The pulse shaping circuit 862 adapts the waveforms of the baseband OOK signal to make the signal fit its allocated frequency sub-channel #1. The digital mixing circuit 863 mixes the digital signal in sub-channel #1. The signals of various sub-channels are then combine at the adder 881 and supplied to the DAC 882 for digital-to-analog conversion and to further downstream logic (not shown). The resultant analog signals are then transmitted through an antenna array in FDMA.

Figure 9A:
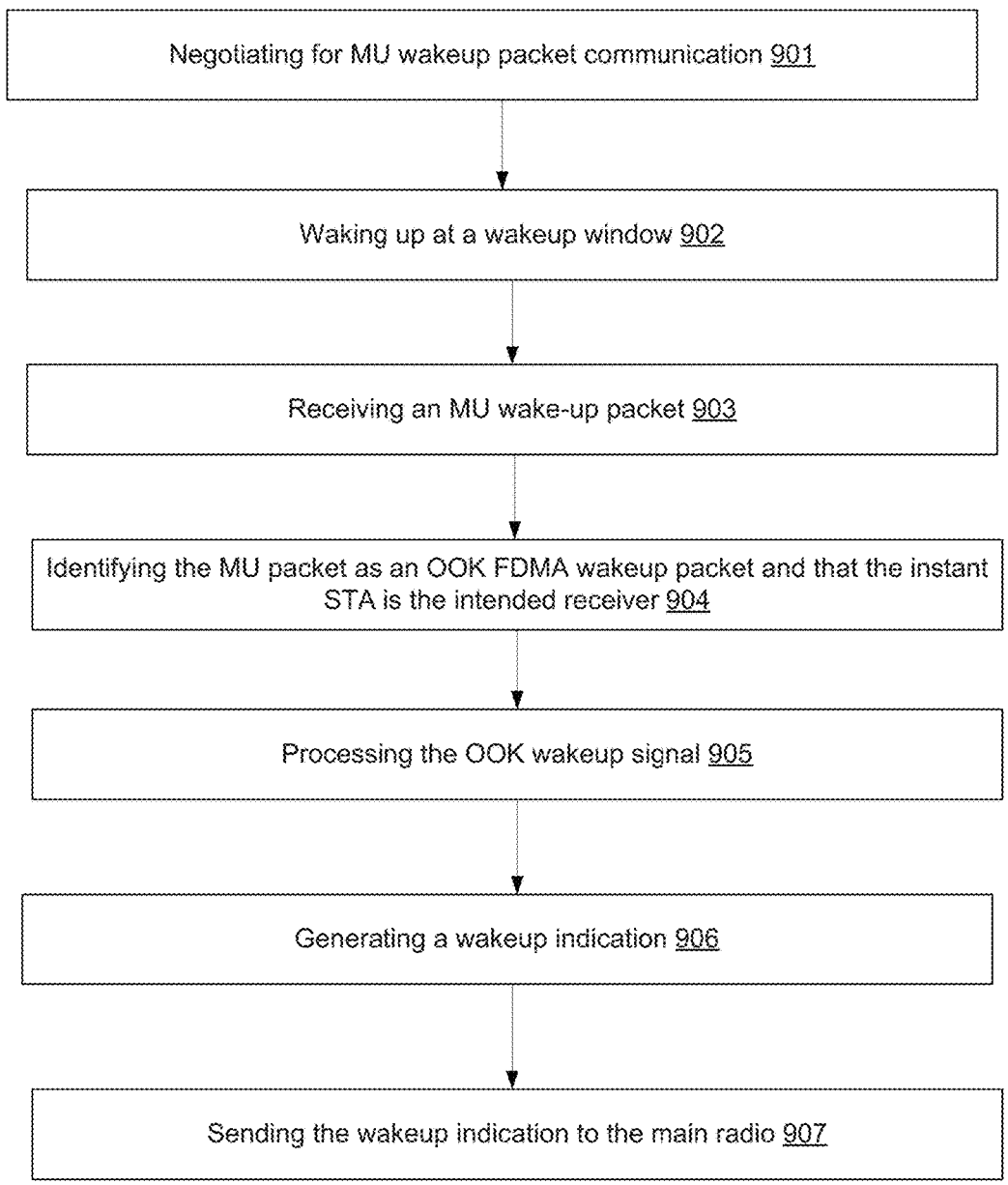
FIG. 9A is a flow chart depicting an exemplary process of waking up an inactive main radio of an STA responsive to a wake-up signal included in an MU wake-up packet in accordance with an embodiment of the present disclosure.

FIG. 9A is a flow chart depicting an exemplary process 900 of waking up an inactive main radio of an STA responsive to a wake-up signal included in an MU wake-up packet in accordance with an embodiment of the present disclosure. Process 900 may be performed by a WUR coupled to the main radio. Corresponding to 801 in FIG. 8A, at 901, a negotiation process is performed to coordinate between a transmit device (e.g., a main radio in an AP) and the WUR with regard to MU wake-up packet communication. The negotiation between the AP and the STA may result in parameters of various aspects to be used in subsequent MU wake-up packet transmission, such as center frequency, frequency bandwidth, OOK modulation parameters, sleep protocol of the WUR, and etc. Renegotiation may occur under various suitable circumstances, e.g., periodically, due to introduction of a new STA to the WLAN or responsive to user instructions.

In this example, the WUR adopts a sleep protocol as described above. At 902, the WUR wakes in a wake-up window. At 903, the WUR receives an MU wake-up packet transmitted through a WLAN. At 904, based on the preambles in the packet, the WUR identifies that the received packet as an FDMA OOK wake-up packet and that the instant STA is an intended receiver. For example, the preambles specify a wake-up signature sequence, an AP ID, a target STA group ID, the instant STA ID, and so on. At 905, the WUR identifies and processes the particular wake-up signal in the MU packet directed to the instant STA. At 906, the processing of the wake-up signal results in a wake-up indication. At 907, the wake-up indication is sent to the main radio, and, in response, the main radio is activated and ready for data transmission activities.

Figure 9B:
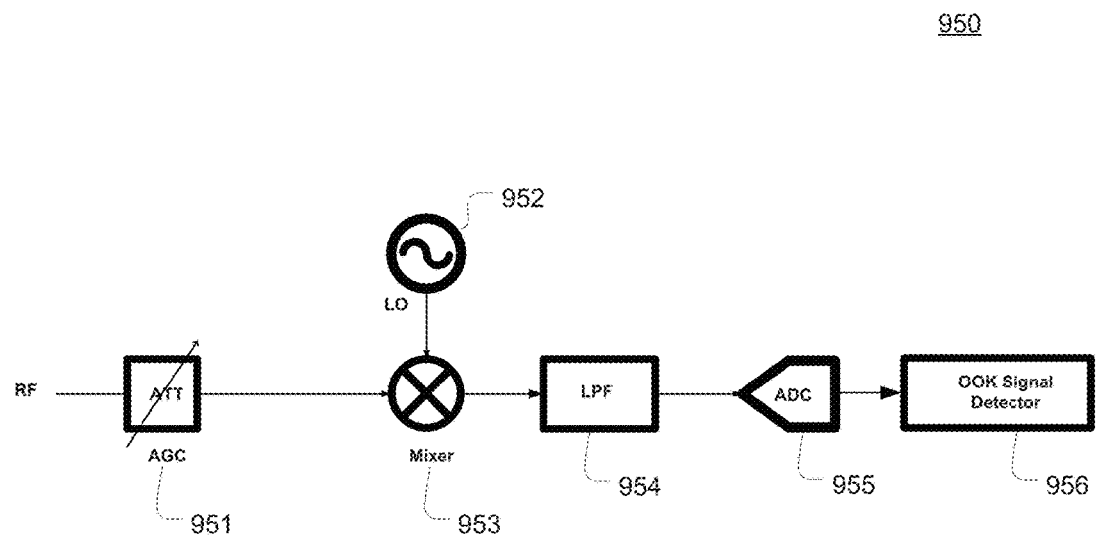
FIG. 9B illustrates the configuration of an exemplary WUR capable of processing an MU wake-up packet to activate a main radio in accordance with an embodiment of the present disclosure.

FIG. 9B illustrates the configuration of an exemplary WUR 950 capable of processing an MU wake-up packet to activate a main radio in accordance with an embodiment of the present disclosure. The MU wake-up packet includes FDMA OOK wake-up signals. The WUR includes an automatic gain controller (AGC) 951, an RF local oscillator 952, a mixer 953, a low pass filter (LPF) 954, an analog-to-digital converter (ADC) 955 and an OOK signal detector 956.

The WUR 950 can receive signals of an MU wake-up packet through a receive antenna (not shown). The AGC 951 includes an attenuator and controls magnitude or gain of the received signal. A filter (not shown) filters RF signal and the RF local oscillator oscillates an RF frequency while shifting to a center frequency of the wake-up signal directed to the WUR 950 and outputs an RF local oscillation frequency to the mixer 953. The mixer 953 converts the RF signal from the filter into a baseband signal by using the RF local oscillation frequency output from the RF local oscillator 952. The LPF 954 filters the baseband signal supplied from the mixer 953 while adjusting to the bandwidth of the wake-up signal as determined through a prior negotiation process. The ADC 955 converts the analog baseband signal output from the LPF 954 into a digital baseband signal.

The OOK signal detector 956 demodulates the digital baseband signal output from the ADC 955. Based on whether energy can be determined in the filtered analog signal, the WUR can determine if the MU wake-up packet carries an OOK wake-up signal in the specific sub-channel directed to the instant STA. Particularly, if the OOK signal detector 956 detects energy in the particular frequency sub-channel, then a wake-up indication is generated for waking up the main.

Figure 10:
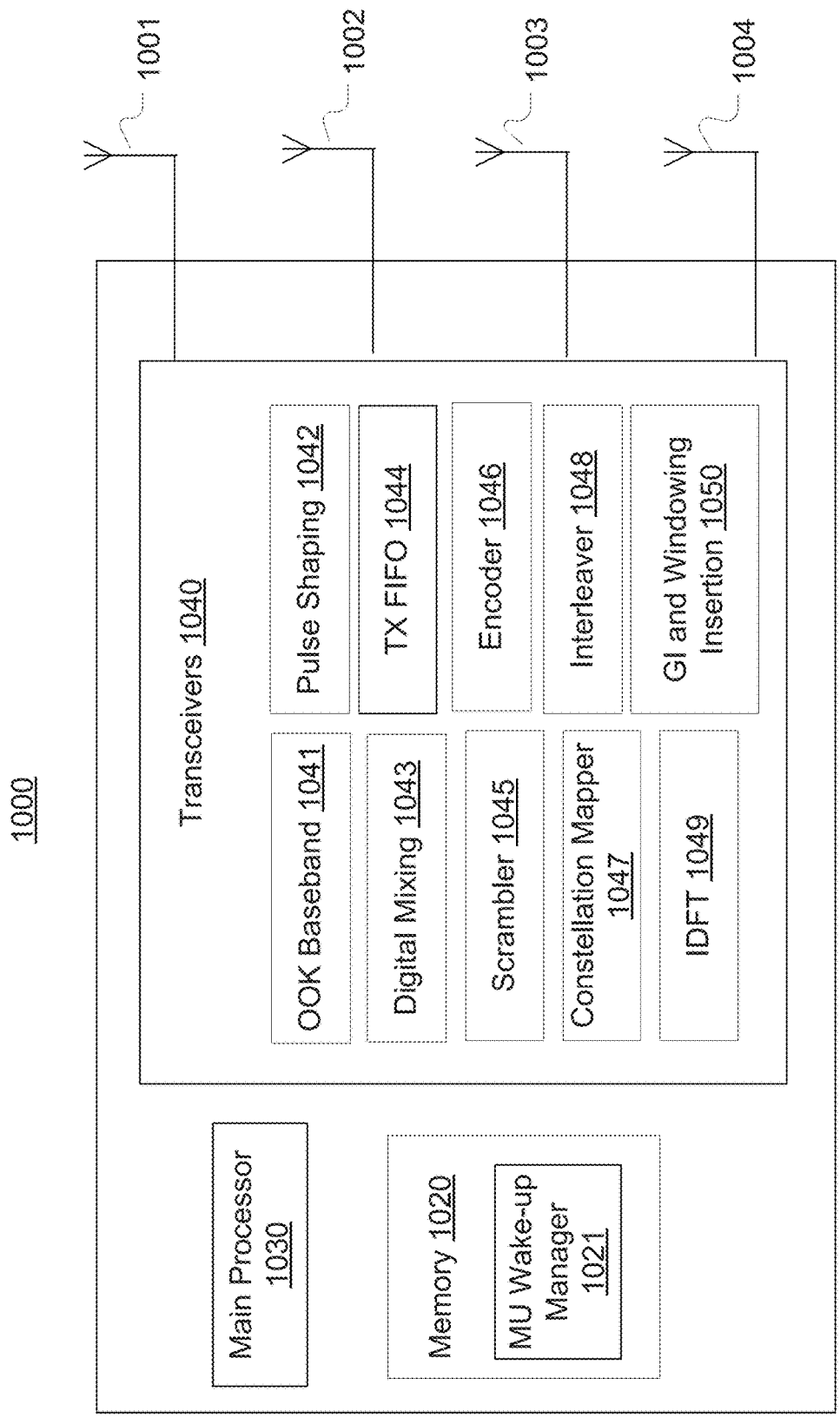
FIG. 10 is a block diagram illustrating an exemplary wireless communication device capable of generating MU wake-up packets in accordance with an embodiment of the present disclosure.

FIG. 10 is a block diagram illustrating an exemplary wireless communication device 1000 capable of generating MU wake-up packets in accordance with an embodiment of the present disclosure. The communication device 1000 may be an AP or non-AP device having a transceiver configured for data communication, e.g., a general purpose computer, a smart phone, a tablet wearable device, a sensor used on Internet of Things (IoT), and etc.

The device 1000 includes a main processor 1030, a memory 1020 and a transceiver 440 coupled to an array of antenna1001-1004. The memory 1020 includes a wake-up manger 1021 that stores processor-executable instructions for generating wake-up signals as well as configurations of other parts of MU wake-up packets, as described in greater detail with reference to FIGS. 1-8A. The wake-up manager 1021 also stores other information related to wake-up packet generation and management, such as the STA IDs, STA group IDs, sleep protocols of the main radios and WURs of the STAs, negotiation protocols, frequency sub-channels allocated to the respective WURs, MU wake-up packet formats, and so on. In some other embodiments, the wake-up manager 1021 is stored in a memory within the transceiver 1040.

The transceiver 1040 includes an OOK baseband module 1041, a pulse shaping module 1042 and digital mixing module 1043 which operate to generate OOK wake-up signals for transmission in FDMA, as described in greater detail with reference to FIG. 8B. The transceiver 1040 further includes various modules of the transmit path which is configured to generate each section of an MU wake-up packet or data packet or any other type of communication transmission units. For instance, it has a transmit First-In-First-Out (TX FIFO) 1044, an encoder 1046, a scrambler 413, an interleaver 1048 a constellation mapper 1047, an inversed discrete Fourier transformer (IDFT) 1049, and a GI and windowing insertion module 1050.

Figure 11:
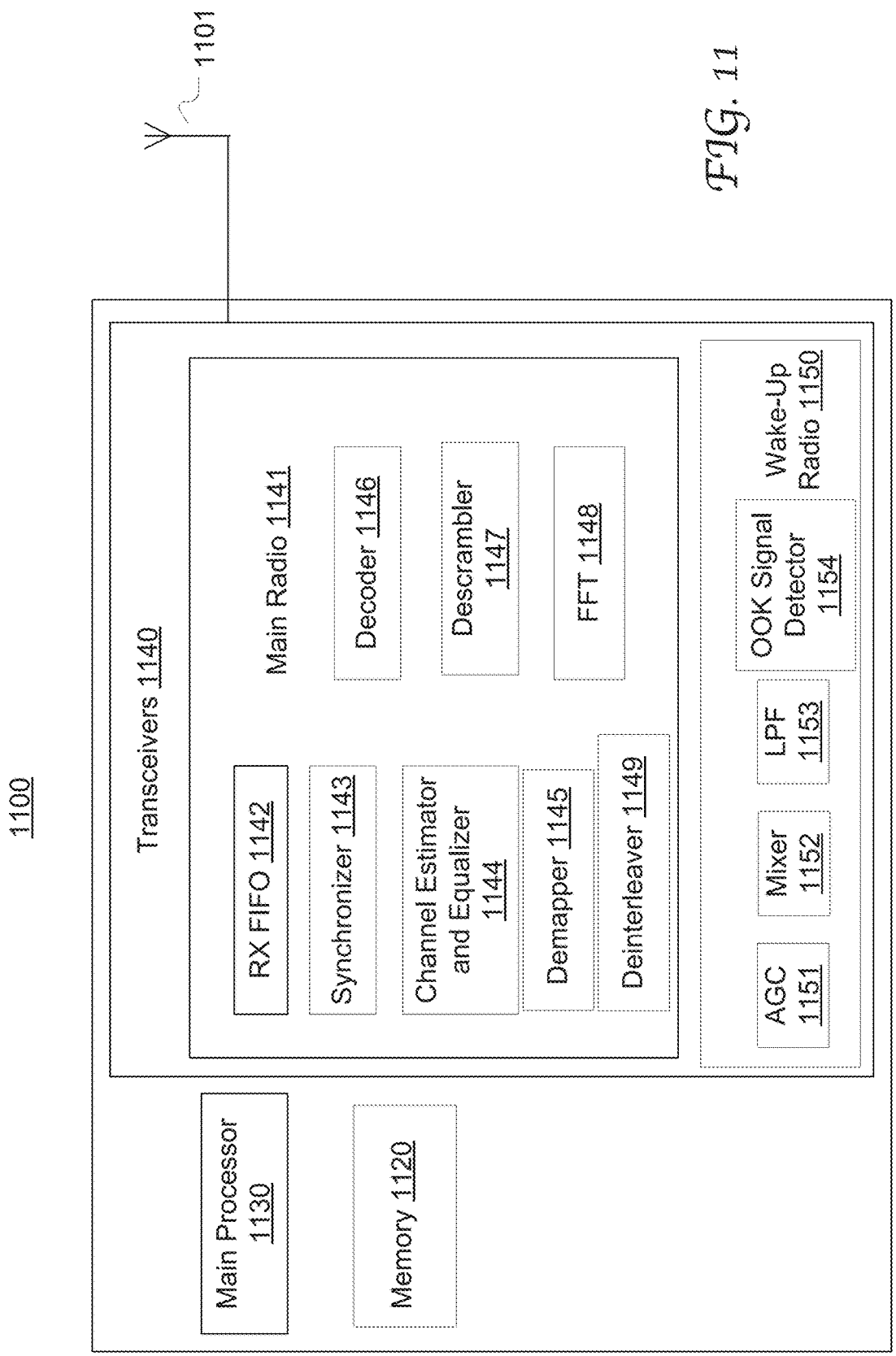
FIG. 11 is a block diagram illustrating an exemplary wireless communication device including a WUR capable of activating a main radio responsive to an MU wake-up packet in accordance with an embodiment of the present disclosure.

FIG. 11 is a block diagram illustrating an exemplary wireless communication device 1100 including a WUR 1150 capable of activating a main radio responsive to an MU wake-up packet in accordance with an embodiment of the present disclosure. The device 1100 may be a non-AP STA operable to perform data communication with other devices through a wireless LAN. The device 1100 may be a general purpose computer, a smart phone, a tablet wearable device, a sensor used on Internet of Things (IoT), and etc.

The device 1100 includes a main processor 1130, a memory 1120 and a transceiver 1140 coupled to an antenna 1101. The transceiver includes a main radio 1141 operable to enter into an inactive state for power conservation. The low power wake-up radio (WUR) 1150 can process an MU wake-up packet and accordingly generate an indication to activate the main radio 1141 as described in greater detail with reference to FIG. 9A. Particularly, the WUR 1150 includes an AGC 1151, a mixer 1152, an LPF 1153 and an OOK signal detector as described in greater detail with reference to FIG. 9B.

Various modules in the main radio 1141 are configured to process received data packets or any other type of communication transmission units. As illustrated, the main radio includes a receive First-In-First-Out (RX FIFO) 1142, a synchronizer 1143, a channel estimator and equalizer 1144, a decoder 1146, a demapper 1145, a deinterleaver 1149, a fast Fourier transformer (FFT) 1148, and a descrambler 1147.

It will be appreciated that the transceiver1040 in FIG. 10 and the transceiver 1141 in FIG. 11 may include a wide range of other suitable components that are well known in the art. The various components can be implemented in any suitable manner that is well known in the art and can be implemented using hardware, firmware and software logic or any combination thereof. Further, in some embodiments, the transceiver 1040 in FIG. 10 may as well include the components in a receive path as described in greater detail with reference to the main radio 1141 in FIG. 11, and vice versa.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of wireless communication, said method comprising,
    generating a packet comprising a first plurality of wake-up radio signals, wherein said generating comprises:
        allocating a sub-channel of a first frequency channel to each of said first plurality of wake-up radio signals; and
        modulating said first plurality of wake-up radio signals using On/OFF Key (OOK) modulation, wherein each of said first plurality of wake-up radio signals is operable to activate a main radio resident in a respective wireless communication device of a first plurality wireless communication devices; and
    transmitting said packet by using Frequency-Division Multiple Access (FDMA), wherein said first plurality of wake-up radio signals in said packet are transmitted through different sub-channels of said first frequency channel, and wherein further each of said first plurality of wake-up radio signals is transmitted through a corresponding sub-channel of said first frequency channel.

2. The method of claim 1, wherein a frequency spacing between sub-channels of each two adjacent wake-up radio signals of said first plurality of wake-up radio signals equals a bandwidth of a sub-channel allocated to a wake-up radio signal, and wherein further sub-channels at upper and lower ends of the first frequency channel are unused.

3. The method of claim 1, wherein said first frequency channel has a bandwidth of approximately 20 MHz, wherein further each of said first plurality of wake-up radio signals is allocated with a bandwidth of approximately 4 MHz.

4. The method of claim 1, wherein said packet further comprises a second plurality of wake-up radio signals operable to activate main radios resident in a second plurality of wireless communication devices, respectively, wherein said generating said packet further comprises allocating a sub-channel of a second frequency channel to each of said second plurality of wake-up radio signals, and wherein further each of said second plurality of wake-up radio signals is transmitted through a corresponding sub-channel of said second frequency channel.

5. The method of claim 1, wherein said packet further comprises a legacy preamble operable to prevent a legacy device from transmitting signals during transmission of said packet, and wherein said legacy preamble is transmitted through said first frequency channel, wherein said generating said packet further comprises inserting a reconfiguration window between said legacy preamble and a wake-up radio signal, and wherein further said reconfiguration window corresponds to a transient period for a transmitter to switch from waveform generation for said legacy preamble to waveform generation for said wake-up radio signal.

6. The method of claim 1 further comprising generating another packet comprising a single wake-up radio signal operable to activate a wireless communication device of said first plurality of wireless communication devices, and wherein further said single wake-up radio signal is transmitted through an allocated sub-channel of said first frequency channel.

7. The method of claim 1, wherein said packet further comprises a second wake-up radio signal operable to activate a main radio resident in a third plurality wireless communication devices, respectively, wherein a first wake-up radio signal of said first plurality of wake-up radio signals and said second wake-up radio signal are allocated with a same sub-channel and transmitted in a cascaded sequence in a time domain.

8. The method of claim 1, wherein said packet further comprises a data field directed to another wireless communication device, and wherein further said generating said packet further comprises modulating said data field by using Orthogonal Frequency-Division Multiple Access (OFDMA) modulation.

9. The method of claim 1 further comprising:
generating another packet comprising a third plurality of wake-up radio signals, wherein said generating comprises:
allocating a sub-channel of a respective frequency channel of a plurality of frequency channels to each of said third plurality of wake-up radio signals, wherein each of said plurality of frequency channels has a bandwidth equal to or greater than 20 MHz, and wherein said sub-channel of said respective frequency channel has a bandwidth of 4 MHz; and
modulating said third plurality of wake-up radio signals using On/OFF Key (OOK) modulation; and
transmitting said another packet by using FDMA.

10. A wireless communication device comprising:
a memory;
a processor coupled to the memory; and
transceiver coupled to said memory, wherein said transceiver is configured to generate a packet comprising first plurality of wake-up radio signals by performing:
allocating a sub-channel of a first frequency channel to each of said first plurality of wake-up radio signals; and
modulating said multiple wake-up radio signals using On/OFF key (OOK) modulation, wherein each of said first plurality of wake-up radio signals is operable to activate a main radio resident in a respective wireless communication device of a first plurality wireless communication devices; and
a transceiver configured to transmit said packet by using Frequency-Division Multiple Access (FDMA), wherein said first plurality of wake-up radio signals in said packet are transmitted through different sub-channels of said first frequency channel, and wherein further each of said first plurality of wake-up radio signals is transmitted through a corresponding sub-channel of said first frequency channel.

11. The wireless communication device of claim 10, wherein a frequency spacing between each two adjacent wake-up radio signals of said first plurality of wake-up radio signals equals a bandwidth of a sub-channel allocated to a wake-up radio signal.

12. The wireless communication device of claim 10, wherein said packet further comprises a second plurality of wake-up radio signals operable to activate main radios resident in a second plurality wireless communication devices, respectively, wherein said transceiver is further configured to allocate a sub-channel of said second frequency channel to each of said second plurality of wake-up radio signals, and wherein further each of said second plurality of wake-up radio signals is transmitted through a corresponding sub-channel of said second frequency channel.

13. The wireless communication device of claim 10, wherein said packet further comprises a legacy preamble operable to prevent a legacy device from transmitting signals during transmission of said packet, and wherein said legacy preamble is transmitted through said first frequency channel, wherein said transceiver is further configured to insert a reconfiguration window between said legacy preamble and a wake-up radio signal, wherein said reconfiguration window corresponds to a resettlement period of a transmitter that transmits said packet.

14. The wireless communication device of claim 10, wherein said transceiver is further configured to generate another packet comprising a single wake-up radio signal operable to activate a wireless communication device of said plurality of wireless communication devices, and wherein further said single wake-up radio signal is transmitted through an allocated sub-channel of said first frequency channel.

15. The wireless communication device of claim 10, wherein said packet further comprises a second wake-up radio signal operable to activate a main radio resident in a third plurality wireless communication devices, respectively, wherein a first wake-up radio signal of said first plurality of wake-up radio signals and said second wake-up radio signal are allocated with a same sub-channel and transmitted in a cascaded sequence in a time domain.

16. The wireless communication device of claim 10, wherein said packet further comprises a data field directed to another wireless communication device, and wherein further said generating further comprises modulating said data field by using Orthogonal Frequency-Division Multiple Access (OFDMA) modulation.

17. The wireless communication device of claim 10, wherein said transceiver is further configured to:
generate another packet comprising a third plurality of wake-up radio signals by performing:
allocating a sub-channel of a respective frequency channel of a plurality of frequency channels to each of said third plurality of wake-up radio signals, wherein each of said plurality of frequency channels has a bandwidth equal to or greater than 20 MHz, and wherein said sub-channel of said respective frequency channel has a bandwidth of 4 MHz; and
modulating said third plurality of wake-up radio signals using On/OFF Key (OOK) modulation; and
transmit said another packet by using FDMA.

18. A wireless communication device comprising:
a memory;
a processor; and
a main radio configured to transmit and receive data packets in an operational mode; and
a wake-up radio coupled to said main radio and comprising an On/OFF Key (OOK) detector, wherein said wake-up radio is configured to:
receive a packet comprising a wake-up radio signal using On/OFF Key (OOK) modulation, wherein said packet comprises a first plurality of wake-up radio signals being transmitted in Frequency-Division Multiple Access (FDMA), wherein said first plurality of wake-up radio signals are directed to a first plurality of wireless communication devices; and
generate a wake-up indication based on said wake-up radio signal, wherein said wake-up indication is operable to cause said main radio to exit from a low power mode and enters said operational mode.

19. The wireless communication device of claim 18, wherein wake-up radio is further configured to:
detect an identification of said wireless communication device in said packet, wherein said wake-up radio signal is associated with said identification, and wherein said wake-up radio signal is transmitted through a sub-channel of a frequency channel; and
demodulate said wake-up radio signal according to On/OFF Key demodulation.

20. The wireless communication device of claim 18, wherein a frequency spacing between sub-channels of each two adjacent wake-up radio signals of said first plurality of wake-up radio signals equals to a bandwidth of a sub-channel allocated to a wake-up radio signal, and wherein further sub-channels at upper and lower ends of the first frequency channel are unused, and wherein said wake-up radio further comprises a low-pass filter configured to supply said wake-up signal to said OOK detector.

21. The wireless communication device of claim 18, wherein said packet further comprises a legacy preamble operable to prevent a legacy device from transmitting signals during transmission of said packet, and wherein said legacy preamble is transmitted through said first frequency channel, wherein said packet further comprises a reconfiguration window between said legacy preamble and a wake-up radio signal.

22. The wireless communication device 18, wherein said packet further comprises a second wake-up radio signal operable to activate a main radio resident in a third plurality wireless communication devices, respectively, wherein said wake-up radio signal and said second wake-up radio signal are transmitted in said packet by using a same sub-channel and transmitted in a cascaded sequence in a time domain.

23. The wireless communication device of claim 18, wherein said packet further comprises a data field directed to another wireless communication device, and wherein said data field is modulated in Orthogonal Frequency-Division Multiple Access (OFDMA) modulation.

* * * * *